(12) United States Patent
Zhang et al.

(10) Patent No.: US 11,474,401 B2
(45) Date of Patent: Oct. 18, 2022

(54) DISPLAY PANEL AND FABRICATION METHOD THEREOF, AND DISPLAY APPARATUS

(71) Applicants: Hefei BOE Optoelectronics Technology Co., Ltd., Anhui (CN); Beijing BOE Technology Development Co., Ltd., Beijing (CN)

(72) Inventors: Zhaoke Zhang, Beijing (CN); Bing Wang, Beijing (CN); Kun Wang, Beijing (CN); Jun Hong, Beijing (CN)

(73) Assignees: Hefei BOE Optoelectronics Technology Co., Ltd., Anhui (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 16/964,848

(22) PCT Filed: Feb. 12, 2020

(86) PCT No.: PCT/CN2020/074872
§ 371 (c)(1),
(2) Date: Jul. 24, 2020

(87) PCT Pub. No.: WO2020/207113
PCT Pub. Date: Oct. 15, 2020

(65) Prior Publication Data
US 2021/0364868 A1    Nov. 25, 2021

(30) Foreign Application Priority Data
Apr. 9, 2019 (CN) .......................... 201910279399.4

(51) Int. Cl.
*G02F 1/1343* (2006.01)

(52) U.S. Cl.
CPC .... *G02F 1/134345* (2021.01); *G02F 1/13439* (2013.01)

(58) Field of Classification Search
None
See application file for complete search history.

(56) References Cited

U.S. PATENT DOCUMENTS 6,348,958 B1 * 2/2002 Matsuoka ......... G02F 1/133514
349/106
6,738,106 B1   5/2004 Tanahara et al.
(Continued)

FOREIGN PATENT DOCUMENTS

CN         101401143 A     4/2009
CN         101887189 A    11/2010
(Continued)

OTHER PUBLICATIONS

Sep. 10, 2021—(CN)—Office Action Appn 201910279399.4 with English translation.

*Primary Examiner* — Ryan Crockett
(74) *Attorney, Agent, or Firm* — Banner & Witcoff, Ltd.

(57) ABSTRACT

A display panel and a fabrication method thereof, and a display apparatus are provided. The display panel includes: a base substrate, and a display region and a non-display region on the base substrate. The display region has a special shaped boundary, and includes: a plurality of display pixels and transition pixels; the transition pixels are provided between the display pixels and the special-shaped boundary; each of the display pixels and each of the transition pixels respectively include: a first electrode and a second electrode. An area of each of the first electrodes of the transition pixels is different from an area of each of the first electrodes of the display pixels; and/or, an area of each of the second elec-
(Continued)

trodes of the transition pixels is different from an area of each of the second electrodes of the display pixel.

11 Claims, 14 Drawing Sheets

(56) References Cited

U.S. PATENT DOCUMENTS

| | | | |
|---|---|---|---|
| 8,711,317 | B2 | 4/2014 | Nonaka |
| 10,241,606 | B2 | 3/2019 | Abe et al. |
| 10,318,033 | B2 | 6/2019 | Xu et al. |
| 10,409,119 | B2 | 9/2019 | Liu et al. |
| 10,816,860 | B2 | 10/2020 | Xiao et al. |
| 2007/0109468 | A1* | 5/2007 | Oku .................. G02F 1/133514 349/110 |
| 2009/0096978 | A1 | 4/2009 | Kim |
| 2009/0102824 | A1 | 4/2009 | Tanaka et al. |
| 2009/0309813 | A1* | 12/2009 | Fujita ............... G02F 1/133512 345/55 |
| 2014/0218971 | A1* | 8/2014 | Wu .......................... G02B 6/08 362/613 |
| 2016/0178940 | A1* | 6/2016 | Yuan .................. G02F 1/133512 359/893 |
| 2016/0291376 | A1 | 10/2016 | Iwatsu et al. |
| 2019/0113811 | A1 | 4/2019 | Iwata et al. |
| 2019/0212619 | A1* | 7/2019 | Kanehiro ............. G02F 1/1337 |
| 2020/0110302 | A1* | 4/2020 | Kuroe .................. G09G 3/3666 |
| 2021/0325750 | A1* | 10/2021 | Adachi ............. G02F 1/136209 |

FOREIGN PATENT DOCUMENTS

| | | |
|---|---|---|
| CN | 105527764 A | 4/2016 |
| CN | 106019753 A | 10/2016 |
| CN | 107045217 A | 8/2017 |
| CN | 107167957 A | 9/2017 |
| CN | 107608145 A | 1/2018 |
| CN | 108292182 A | 7/2018 |
| CN | 108321183 A | 7/2018 |
| CN | 108345152 A | 7/2018 |
| CN | 108732834 A | 11/2018 |
| CN | 108873504 A | 11/2018 |
| CN | 109416491 A | 3/2019 |
| CN | 109801583 A | 5/2019 |
| CN | 109884827 A | 6/2019 |
| JP | 2001154222 A | 6/2001 |
| KR | 20080026908 A | 3/2008 |

* cited by examiner

DISPLAY PANEL AND FABRICATION METHOD THEREOF, AND DISPLAY APPARATUS

This application is a U.S. National Phase Entry of International Application No. PCT/CN2020/074872 filed on Feb. 12, 2020, designating the United States of America and claiming priority to Chinese Patent Application No. 201910279399.4 filed on Apr. 9, 2019. The present application claims priority to and the benefit of the above-identified applications and the above-identified applications are incorporated by reference herein in their entirety.

TECHNICAL FIELD

The present disclosure relates to a field of display technologies, and more particularly, to a display panel and a fabrication method thereof, and a display apparatus.

BACKGROUND

With rapid development of display technologies, a screen-to-body ratio of a display apparatus has been made higher and higher. Special-shaped cutting has become an important means of increasing the screen-to-body ratio of the display apparatus; a mainstream direction of special-shaped cutting in a related art is to open a slot at a camera position and cut R angles at four corners; and therefore, a display region of the display apparatus with a relatively high screen-to-body ratio is special-shaped with an arc-shaped boundary.

An inventor finds that, the display region of the display apparatus in the related art includes pixel units, and the pixel units are rectangular, so that the pixel units cannot be arranged to match the boundary of the display region, which causes relatively obvious jaggedness or graininess recognizable by naked eyes to appear in a boundary region of the display apparatus when displaying a picture, thereby affecting display quality.

SUMMARY

Some embodiments of the disclosure provide a display panel, comprising: a base substrate, and a display region and a non-display region on the base substrate; wherein the display region has a special-shaped boundary, and includes: a plurality of display pixels and transition pixels; the transition pixels are provided between the display pixels and the special-shaped boundary; each of the display pixels and each of the transition pixels respectively include: a first electrode and a second electrode insulated from the first electrode; and the first electrode and the second electrode are configured to apply a voltage to the display pixel or the transition pixel corresponding thereto; wherein the first electrodes and the second electrodes of the transition pixels and the display pixels satisfy at least one of relationships below: an area of each of the first electrodes of the transition pixels is different from an area of each of the first electrodes of the display pixels; and an area of each of the second electrodes of the transition pixels is different from an area of each of the second electrodes of the display pixel.

In some examples, the plurality of display pixels and transition pixels are arranged in a two-dimensional matrix along a row direction and a column direction; and the special-shaped boundary is neither parallel nor perpendicular to the row direction and the column direction.

In some examples, the special-shaped boundary has a circular arc shape.

In some examples, at least one row or one column of transition pixels are provided; and in a direction from a side close to the special-shaped boundary to a side away from the special-shaped boundary, areas of the first electrodes, areas of the second electrodes, or areas of both the first electrodes and the second electrodes of the row or the column of transition pixels gradually increase or decrease.

In some examples, each of the transition pixels and each of the display pixels further include an insulating layer, respectively; the insulating layer is provided between the first electrode and the second electrode.

In some examples, the transition pixels and the display pixels have an equal area.

In some examples, the first electrode is a pixel electrode and the second electrode is a common electrode; or, the first electrode is a common electrode and the second electrode is a pixel electrode.

In some examples, the first electrode is a planar electrode, and the second electrode is a slit electrode; the slit electrode includes: at least two sub-electrodes with a slit provided between two adjacent sub-electrodes.

In some examples, the second electrodes of the transition pixel and the second electrodes of the display pixel have at least one difference therebetween: numbers of the sub-electrodes are different, and widths of the sub-electrodes are different.

In some examples, at least one row or one column of transition pixels are provided; and in the direction from the side close to the special-shaped boundary to the side away from the special-shaped boundary: the numbers of sub-electrodes, the widths of the sub-electrodes, or both the numbers of sub-electrodes and the widths of the sub-electrodes in the row or the column of the transition pixels gradually increase; or, the numbers of sub-electrodes, the widths of the sub-electrodes, and both the numbers of sub-electrodes and the widths of the sub-electrodes in the row or the column of the transition pixels gradually decrease.

In some examples, an orthogonal projection of the first electrode on the base substrate covers an orthogonal projection of the second electrode on the base substrate.

In some examples, a material of the first electrode and the second electrode includes a transparent conductive material.

Some embodiments of the disclosure provide a display panel, comprising: a base substrate, and a display region and a non-display region on the base substrate; wherein the display region has a special-shaped boundary, and includes: a plurality of display pixels and transition pixels, the display pixels and the transition pixels are configured such that a gray scale displayed by the transition pixels is less than a gray scale displayed by the display pixels under control of a same display signal.

In some examples, the plurality of display pixels and transition pixels are arranged in a two-dimensional matrix along a row direction and a column direction; and the special-shaped boundary is neither parallel nor perpendicular to the row direction and the column direction.

In some examples, the special-shaped boundary has a circular arc shape.

Some embodiments of the disclosure provides a display apparatus, comprising: the display panel according to any items mentioned above.

Some embodiments of the disclosure provide a fabrication method of a display panel, comprising: providing a base substrate; forming a display region and a non-display region on the base substrate; the display region having a special-shaped boundary, and including: a plurality of display pixels and transition pixels; the transition pixels being provided between the display pixels and the special-shaped boundary; each of the display pixels and each of the transition pixel respectively including: a first electrode and a second electrode insulated from the first electrode; and the first electrode and the second electrode being configured to apply a voltage to the display pixel or the transition pixel corresponding thereto; wherein the first electrodes and the second electrodes of the transition pixels and the display pixels satisfy at least one of relationships below: an area of each of the first electrodes of the transition pixels is different from an area of each of the first electrodes of the display pixels; and an area of each of the second electrodes of the transition pixels is different from an area of each of the second electrodes of the display pixel.

In some examples, the method further comprises: forming an insulating layer between the first electrode and the second electrode.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The steps shown in the flowchart of the drawings may be performed in a computer system, for example, including a set of computer-executable instructions. Although a logical order is shown in the flowchart, in some cases, the steps shown or described may be performed in a different order.

Unless otherwise specified, the technical terms or scientific terms used in the disclosure have normal meanings understood by those skilled in the art. The words "first", "second" and the like used in the disclosure do not indicate the sequence, the number or the importance but are only used for distinguishing different components. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

Figure 1:
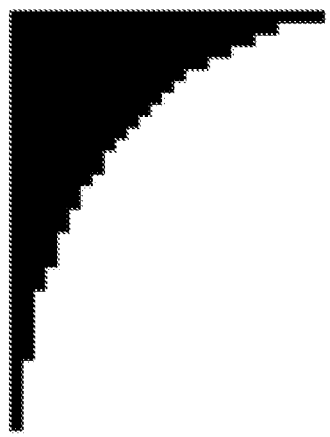
FIG. 1 is a schematic diagram of jaggedness of a display panel.

FIG. 1 is a schematic diagram of jaggedness at a corner of a display panel. For example, FIG. 1 shows a partial plan view at an upper left corner of the display panel; a black portion is a non-display region, and a display region is at a lower right side of the black portion. As shown in FIG. 1, an edge of the display region presents jaggedness or graininess. Jaggedness or graininess is related to a degree of sudden change in brightness of pixels; and the greater the sudden change in brightness of the pixels, the more obvious the jaggedness or graininess. When displaying a picture, brightness of transition pixels changes from 0 to true brightness of the pixels, which makes jaggedness or graininess more obvious, and affects display quality.

Figure 2:
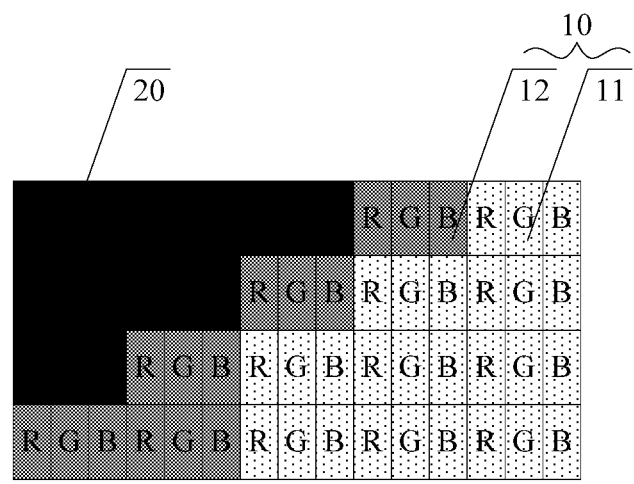
FIG. 2 is a partial schematic diagram of a display panel provided by an embodiment of the present disclosure.

An embodiment of the present disclosure provides a display panel; FIG. 2 is a partial schematic diagram of the display panel provided by the embodiment of the present disclosure; and as shown in FIG. 2, the display panel provided by the embodiment of the present disclosure comprises: a base substrate (not shown) as well as a display region 10 and a non-display region 20 provided on the base substrate; the display region 10 having a special-shaped boundary, and including: a plurality of display pixels 11 and transition pixels 12; the transition pixels 12 being provided between the display pixels 11 and the special-shaped boundary; the display pixel 11 and the transition pixel 12 each including: a first electrode and a second electrode (not shown) insulated from the first electrode; and the first electrode and the second electrode being configured to load a voltage to the display pixel or the transition pixel corresponding thereto.

In this embodiment, an area of the first electrode of the transition pixel 12 is different from an area of the first electrode of the display pixel 11, and/or an area of the second electrode of the transition pixel 12 is different from an area of the second electrode of the display pixel 11, so that transmittance of the transition pixel 12 is less than transmittance of the display pixel 11 when a same voltage is loaded to the display pixel 11 and the transition pixel 12.

In this embodiment, if pixels are different in area of the first electrode and/or the second electrode, then the pixels are different in transmittance, so in the display panel provided by the embodiment of the present disclosure, when a same voltage is loaded to the transition pixel and the display pixel, the transition pixel and the display pixel are different in transmittance; in the embodiment of the present disclosure, the area of the second electrode of the transition pixel 12 may be set such that the transmittance of the transition pixel 12 is less than the transmittance of the display pixel 11, which may implement gradual change in brightness.

In this embodiment, all display pixels have an equal area, and a first electrode and a second electrode in each display pixel also have an equal area.

Optionally, the base substrate may be a rigid substrate or a flexible substrate, wherein, the rigid substrate may be made of one or more selected from the group consisting of glass and metal foil, but is not limited thereto; and the flexible substrate may be made of one or more selected from the group consisting of polyethylene terephthalate, ethylene terephthalate, polyetheretherketone, polystyrene, polycarbonate, polyaryl ester, polyarylate, polyimide, polyvinyl chloride, polyethplene, and textile fibers, but is not limited thereto.

For example, the display panel according to this embodiment can comprise: an array substrate or a combination of the array substrate and a color filter substrate, which will not be limited in the embodiment of the present disclosure. The non-display region may be provided with a black matrix or other structures that do not display.

Optionally, the special-shaped boundary of the display region extends non-linearly, and may have an R-angle shape, which is specifically determined according to a special-shaped cutting mode of the display panel, and will not be limited in the embodiment of the present disclosure. For example, the R-angle shape refers to a shape formed by rounding a corner of a polygon. Therefore, the special-shaped boundary according to the embodiment of the present disclosure may have a circular arc shape or other curved shapes, but the embodiment according to the present disclosure is not limited thereto. For example, the special-shaped boundary according to the embodiment of the present disclosure is neither parallel nor perpendicular to a row direction and a column direction of pixel arrangement. It should be noted that, the shape of the special-shaped boundary here is a macroscopic shape, not a microscopic shape at a pixel size level.

Optionally, in this embodiment, voltages loaded to the display pixel and the transition pixel through the first electrode and the second electrode are the same, and are voltages that can make the display panel to display a completely white picture, such that jaggedness or graininess of the boundary of the display panel is reduced when the display panel displays a completely white picture, so as to further ensure that a user does not perceive jaggedness or graininess when the display panel displays a normal picture, thereby improving user experience.

In order to simplify a fabrication process of the display panel, in this embodiment, the first electrode of the display pixel and the first electrode of the transition pixel are arranged in a same layer; and the second electrode of the display pixel and the second electrode of the transition pixel are arranged in a same layer.

Figure 3A:
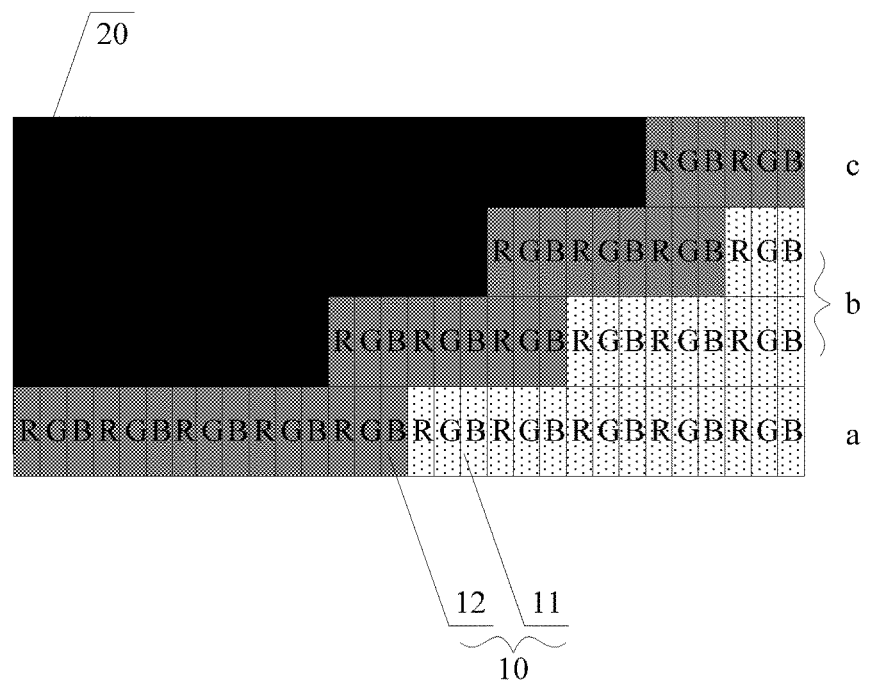
FIG. 3A is a transition pixel selection solution provided by the embodiment of the present disclosure.
Figure 3B:
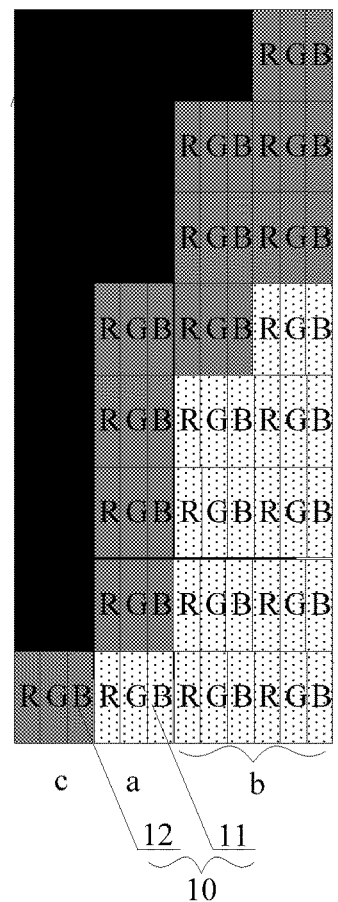
FIG. 3B is another transition pixel selection solution provided by the embodiment of the present disclosure.

In this embodiment, there is at least one row or one column of transition pixels in the display region; the number of transition pixels included in the row of pixels and/or the column of pixels may be one or more; it should be noted that, the number of transition pixels included in the row of pixels or the column of pixels is not specifically limited in the embodiment of the present disclosure, but is specifically determined according to actual conditions. FIG. 3A is a transition pixel selection solution provided by the embodiment of the present disclosure, as shown in FIG. 3A, the line a includes 5 transition pixels, the line b includes 3 transition pixels, and the line c includes 2 transition pixels; and FIG. 3B is another transition pixel selection solution provided by the embodiment of the present disclosure, as shown in FIG. 3B, the column a includes 4 transition pixels, the column b includes 3 transition pixels, and the column c includes 1 transition pixel. For example, with respect to obviousness degrees of jaggedness in different regions, different numbers of transition pixels are set; the more obvious the jaggedness is, the more transition pixels are needed; and the less obvious the jaggedness is, the fewer transition pixels are needed, which will not be limited in the embodiment of the present disclosure.

The display panel provided by the embodiment of the present disclosure comprises: the base substrate, the display region and the non-display region provided on the base substrate; the display region having a special-shaped boundary, and including: a plurality of display pixels and transition pixels; the transition pixels being provided between the display pixels and the special-shaped boundary; each of the display pixels and the transition pixels including a first electrode and a second electrode insulated from the first electrode; and the first electrode and the second electrode being configured to load a voltage to the display pixel or the transition pixel corresponding thereto; wherein, the area of the first electrode of the transition pixel is different from the area of the first electrode of the display pixel, and/or the area of the second electrode of the transition pixel is different from the area of the second electrode of the display pixel, such that the transmittance of the transition pixel is less than the transmittance of the display pixel when a same voltage is loaded to the display pixel and the transition pixel. In the embodiment of the present disclosure, the area of the first electrode of the transition pixel is different from the area of the first electrode of the display pixel, and/or the area of the second electrode of the transition pixel is different from the area of the second electrode of the display pixel, which can implement transitional change in brightness, weaken user's perception of brightness change at the special-shaped boundary of the display picture, make a picture near the special-shaped boundary more natural and soft, and blur jaggedness or graininess appearing at the edge of the display panel to a certain extent, thereby improving display quality.

In order to blur jaggedness or graininess, first electrodes and/or second electrodes of transition pixels may be set to have different areas; there is at least one row or one column of transition pixels, and in a direction from a side close to the special-shaped boundary to a side away from the special-shaped boundary, areas of first electrodes and/or second electrodes of the row or the column of transition pixels increase, or areas of first electrodes and/or second electrodes of the row or the column of transition pixels decrease, such that when all the transition pixels are loaded with a same voltage, transmittance of the transition pixels 12 gradually increases in the direction from the side close to the special-shaped boundary to the side away from the special-shaped boundary.

In this embodiment, in order to weaken jaggedness or graininess at the edge of the display panel, when a voltage is loaded, required transmittance of the transition pixel during display is related to a distance between the transition pixel and the special-shaped boundary; and the greater the distance to the special-shaped boundary, the greater the required transmittance of the transition pixel during display.

Figure 4:
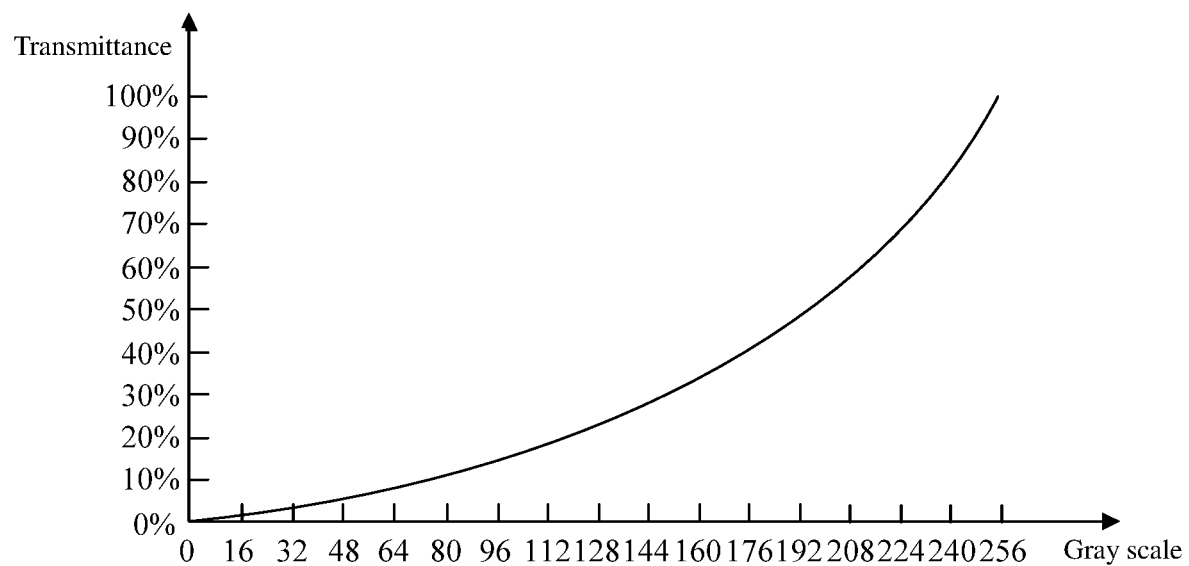
FIG. 4 is a schematic diagram of a gamma curve.
Figure 5:
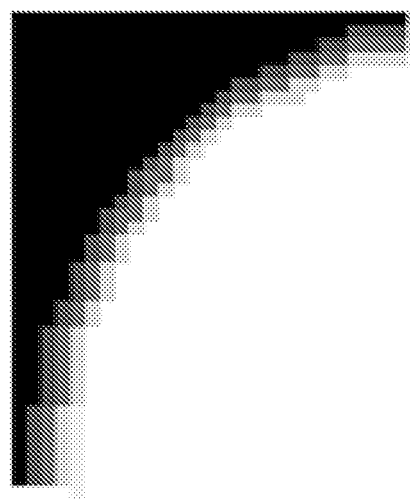
FIG. 5 is a schematic diagram of jaggedness of the display panel according to the embodiment of the present disclosure.

In this embodiment, FIG. 4 is a schematic diagram of a gamma curve; FIG. 5 is a schematic diagram of jaggedness of the display panel provided by the embodiment of the present disclosure; and as shown in FIG. 4, in the gamma curve, a horizontal direction represents a gray scale of a pixel, and a vertical direction represents pixel transmittance. The pixel transmittance is proportional to the gray scale of the pixel, that is, the greater the pixel transmittance, the greater the gray scale of the pixel. In this embodiment, the second electrodes of the transition pixels are set to have different areas, such that transmittance of the transition pixels gradually increases in the direction from the side close to the special-shaped boundary to the side away from the special-shaped boundary, that is to say, as shown in FIG. 5, when the display panel displays an image, a gray scale of a transition pixel 12 close to the special-shaped boundary is lower than a gray scale of a transition pixels 12 away from the special-shaped boundary, such that brightness from the edge of the display region toward an inner side increases sequentially with gentle change, which can further weaken the user's perception of brightness change at the special-shaped boundary of the display picture, make the picture near the special-shaped boundary more natural and soft, and further blur jaggedness or graininess, thereby improving display quality.

Optionally, in this embodiment, as shown in FIG. 2, the transition pixel 12 and the display pixel 11 have an equal area.

In the display panel provided by the embodiment of the present disclosure, only the area of the second electrode of the transition pixel is adjusted, without adjusting a size of the display pixel, or additionally adjusting a data line, a scan line, and a black matrix, such that design of the display panel provided by this embodiment is simple with large margin, low implementation costs, and high practicability.

Figure 6:
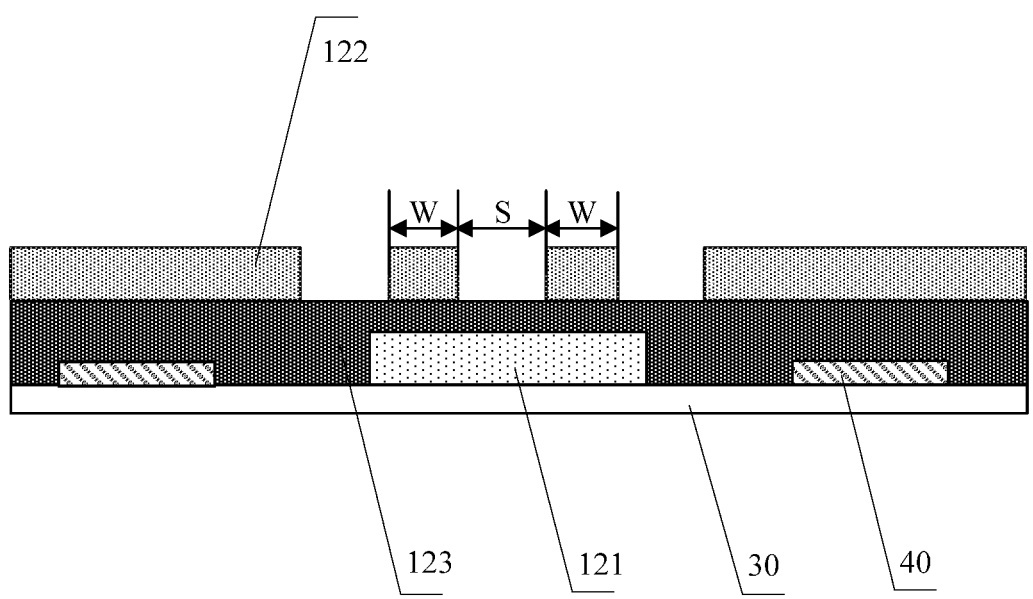
FIG. 6 is a side view I of the display panel provided by the embodiment of the present disclosure.
Figure 7:
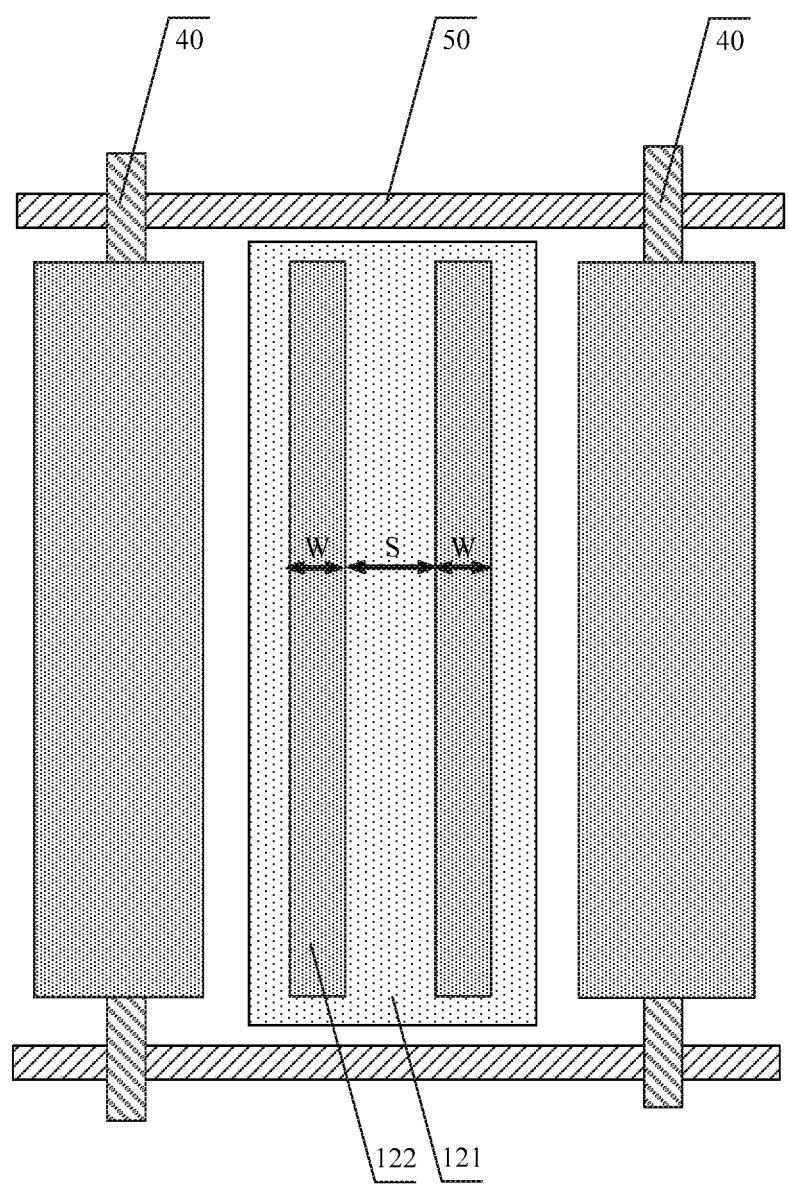
FIG. 7 is a top view corresponding to FIG. 6.

FIG. 6 is a side view I of the display panel provided by the embodiment of the present disclosure; and FIG. 7 is a top view corresponding to FIG. 6. As shown in FIG. 6 and FIG. 7, the display panel provided by the embodiment of the present disclosure comprises a base substrate 30 as well as a transition pixel, a data line 40 and a scan line 50 provided on the base substrate. The transition pixel includes: a first electrode 121, a second electrode 122, and an insulating layer 123 provided between the first electrode 121 and the second electrode 122. It should be noted that, in order to explain positional relationship between the first electrode and the second electrode, the insulating layer 123 is not shown in FIG. 7. For example, a display pixel 11 further includes an insulating layer provided between the first electrode and the second electrode.

Optionally, FIG. 6 is described by taking an example in which the first electrode 121 is provided on a side of the insulating layer 123 that is close to the base substrate 30, and the second electrode 122 is provided on a side of the insulating layer 123 that is away from the base substrate 30.

Optionally, the first electrode 121 may be a pixel electrode or a common electrode, and the second electrode 122 may be a common electrode or a pixel electrode. For example, the first electrode 121 is a pixel electrode and the second electrode 122 is a common electrode, or the first electrode 121 is a common electrode and the second electrode 122 is a pixel electrode, which will not be limited in the embodiment of the present disclosure.

Optionally, the first electrode 121 is made of a transparent conductive material, such as indium tin oxide or zinc tin oxide, which will not be limited in the embodiment of the present disclosure.

Optionally, the second electrode 122 is made of a transparent conductive material, such as indium tin oxide or zinc tin oxide, which will not be limited in the embodiment of the present disclosure.

In this embodiment, in the transition pixel and the display pixel, the first electrode is a planar electrode, and the second electrode is a slit electrode.

In this embodiment, the slit electrode includes: at least two sub-electrodes, wherein, there is a slit between two adjacent sub-electrodes.

Optionally, the sub-electrode may have other shape of a rectangle, a square, or a triangle, etc., which is determined as actually required, and will not be limited in the embodiment of the present disclosure.

Optionally, respective sub-electrodes in a same slit electrode have a same shape, and respective sub-electrodes may have a same width, or may also have different widths; when there are more than three sub-electrodes, distances S of slits between adjacent sub-electrodes may be the same or different. For example, respective sub-electrodes have a same size; and when there are more than three sub-electrodes, the distances S of slits between adjacent sub-electrodes are the same.

In this embodiment, there is at least one difference between the second electrodes in the transition pixel and the display pixel: the numbers of sub-electrodes are different, and widths of the sub-electrodes are different, which will not be limited in the embodiment of the present disclosure. It should be noted that, in a case where a pixel area is determined, there is correspondence between a width of a slit between adjacent sub-electrodes and widths of the sub-electrodes; and the width of the slit between adjacent sub-electrodes will change with the widths of the sub-electrodes.

Optionally, as shown in FIG. 6 to FIG. 7, in each transition pixel, a first electrode 121 is a planar electrode, and a second electrode 122 is a slit electrode.

It should be noted that, there is at least one row or one column of transition pixels; and in the direction from the side close to the special-shaped boundary to the side away from the special-shaped boundary, the numbers of sub-electrodes in the row or the column of transition pixels increase, and/or widths of the sub-electrodes in the row or the column of transition pixels gradually increase; or, the numbers of sub-electrodes in the row or the column of transition pixels decrease, and/or the widths of the sub-electrodes in the row or the column of transition pixels gradually decrease.

Figure 8:
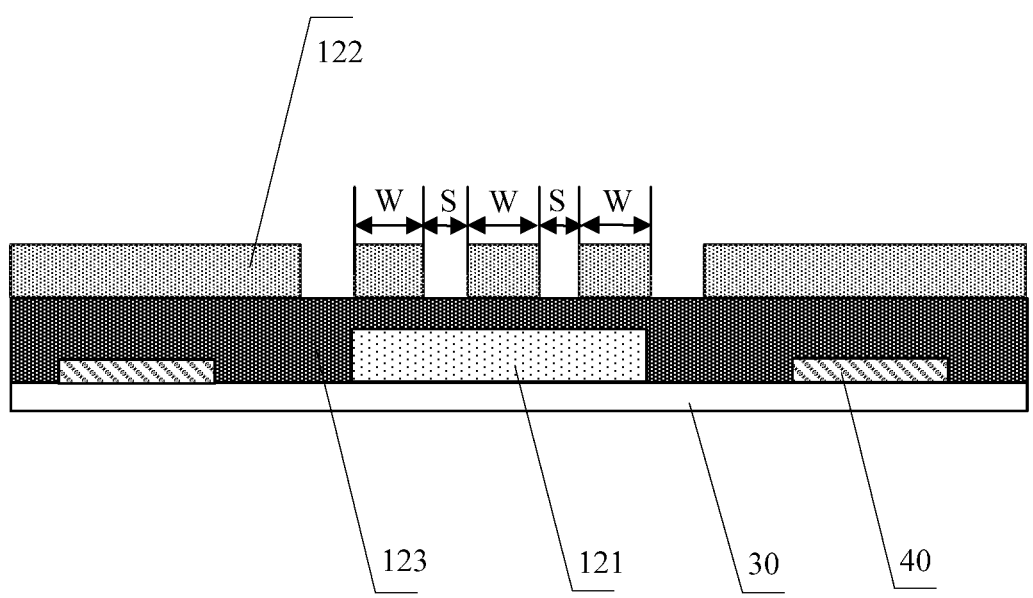
FIG. 8 is a side view II of the transition pixel provided by the embodiment of the present disclosure.
Figure 9:
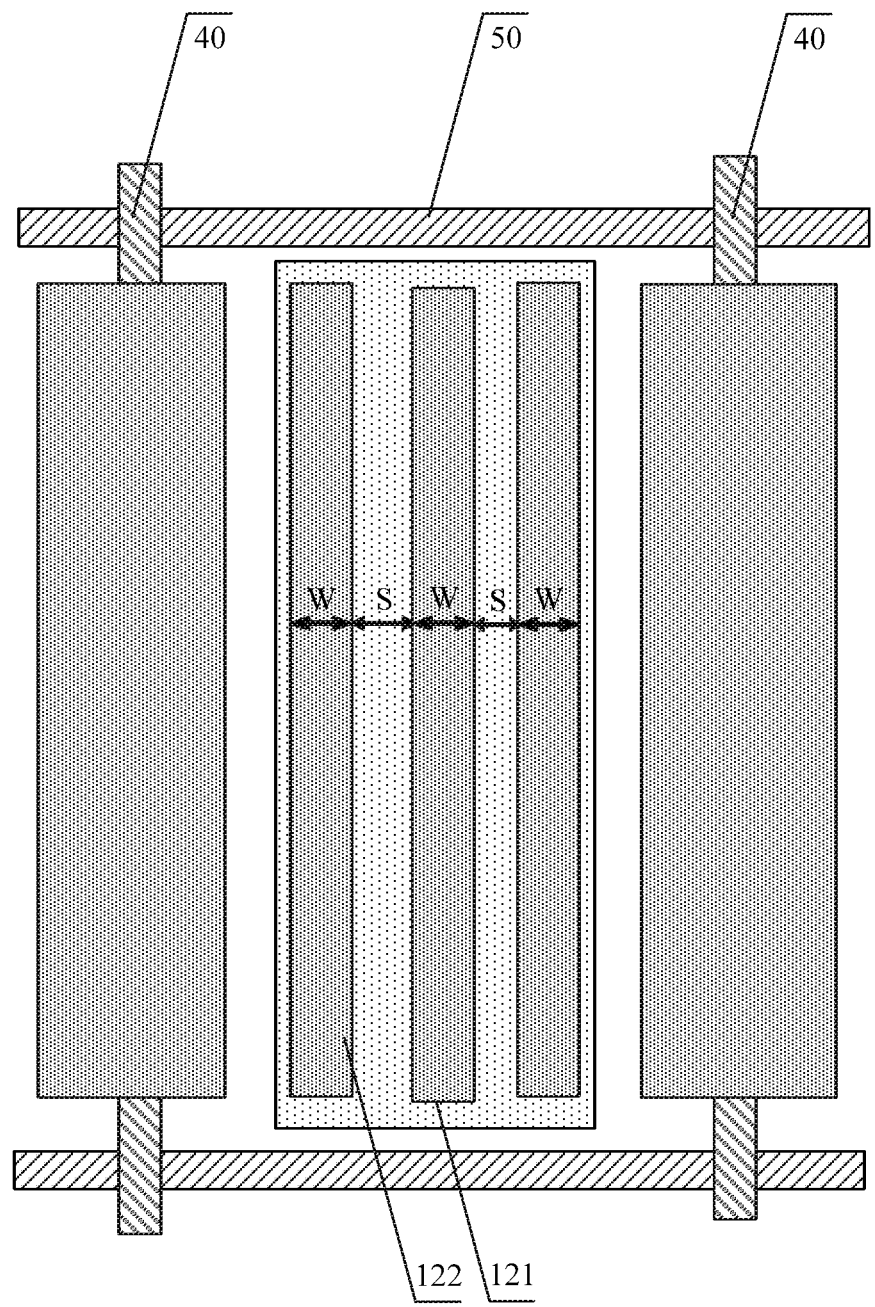
FIG. 9 is a top view corresponding to FIG. 8.

It should be noted that, FIG. 6 and FIG. 7 are described by taking the number of sub-electrodes included in the second electrode as two. FIG. 8 is a side view II of the transition pixel provided by the embodiment of the present disclosure; FIG. 9 is a top view corresponding to FIG. 8; and FIG. 8 to FIG. 9 are described by taking the number of sub-electrodes included in the second electrode as three, wherein, the number of sub-electrodes included in the second electrode may also be more than three, which will not be limited in the embodiment of the present disclosure.

In this embodiment, in order to ensure normal display of the display panel, an orthogonal projection of the first electrode on the base substrate covers an orthogonal projection of the second electrode on the base substrate.

In this embodiment, the number of transition pixels and the gray scale displayed by the transition pixels are both set by a worker; and in order to blur jaggedness at the edge of the display panel, the worker determines the transmittance of the transition pixel according to the preset gray scale of the transition pixel and the gamma curve, and determines the number of sub-electrodes of the transition pixel and a width W of a sub-electrode according to the transmittance of the transition pixel, where, W is a width of each sub-electrode. For example, when the pixel area is determined, S decreases as W increases, and S is a width of a slit between adjacent sub-electrodes.

For example, the image displayed by the display panel is an RGB image, wherein, a color of each pixel in the RGB image is determined by three components R, G and B; with respect to one pixel, if color gradation of the three components is 8, then a value range of a gray scale corresponding to the pixel is 0 to 255. The gray scale of the pixel of the display panel is related to pixel transmittance. With respect to the transition pixel, if a gray scale thereof is 63, then its corresponding transmittance T satisfies T=(gray scale/255)^2.20≈046, where, 2.2 is a parameter determined according to human eyes. Therefore, when a same loading voltage is applied to the second electrodes of the transition pixels, the gray scales of the transition pixels are different due to difference in transmittance of the transition pixels. In order to blur jaggedness or graininess of the display panel and implement transitional change in brightness of the special-shaped boundary of the display panel, the transmittance of the transition pixels are required to be different.

For example, in order to blur jaggedness or graininess of the display panel, and implement transitional change in brightness of the special-shaped boundary of the display panel, by taking three transition pixels per row as an example, in the direction from the side close to the special-shaped boundary to the side away from the special-shaped boundary, gray scales of the transition pixels may be respectively 63, 127 and 191, and according to the gamma curve, corresponding transmittance of the transition pixels is respectively 4.61%, 21.58% and 52.95%.

In order to simplify setting of a gray scale of a pixel and reduce the amount of data and calculation, the gray scale of the pixel is divided into several intervals, and a feature value is set for each interval. For example, the gray scale range of 0 to 255 may be divided into 4 intervals, and a step size of each interval is 64, that is, gray scale ranges of these intervals are respectively 0 to 63, 64 to 127, 128 to 191, and 192 to 255. Feature values of the respective intervals may be taken from minimum values (e.g., 0, 64, 128, 192), maximum values (e.g., 63, 127, 191, 255), intermediate values (e.g., 35, 96, 150, 224), and so on. Intervals are divided arbitrarily, as long as gray scale transition meets requirements. The embodiment of the present disclosure is not limited thereto.

In this embodiment, there is correspondence between the pixel transmittance and the W/S of the pixel, where, W is a width of a sub-electrode in the pixel, and S is a distance of a slit between adjacent sub-electrodes. After obtaining the transmittance of the transition pixel, the worker sets the transition pixel according to the correspondence between the pixel transmittance and the W/S of the pixel, such that the transmittance of the transition pixel can meet the requirements of blurring the edge of the display panel.

In actual application, relationship between the pixel transmittance and the width of W/S may be obtained through simulation by light simulation software known to those skilled in the art, which will not be limited in the embodiment of the present disclosure.

Figure 10:
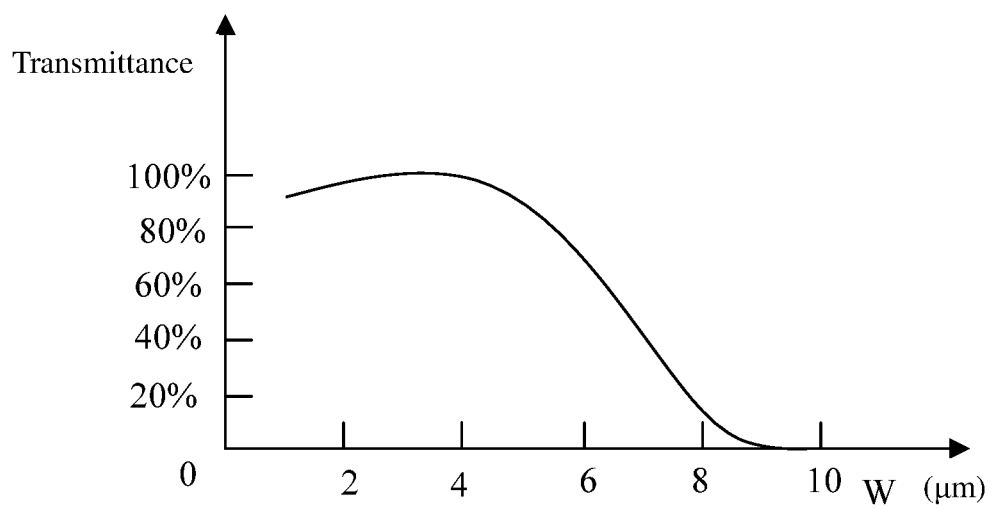
FIG. 10 is a relationship diagram I between pixel transmittance and W.
Figure 11:
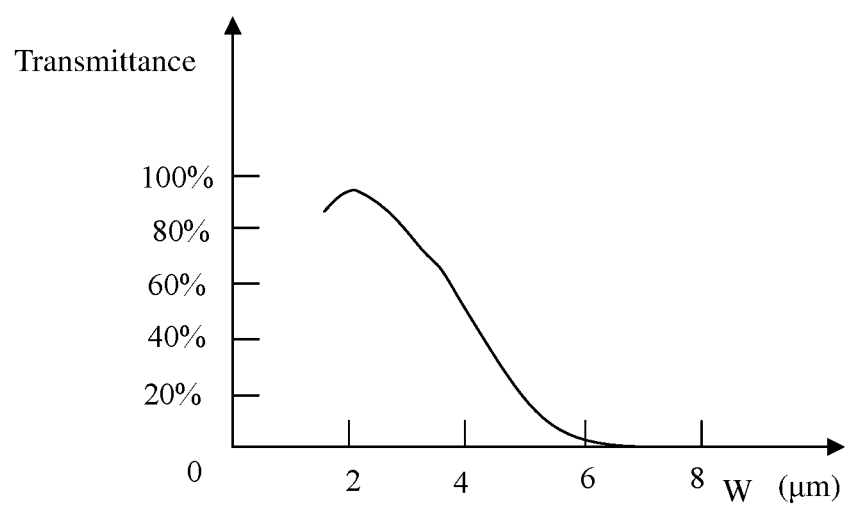
FIG. 11 is a relationship diagram II between pixel transmittance and W.

FIG. 10 is a relationship diagram I between pixel transmittance and W; FIG. 11 is a relationship diagram II between pixel transmittance and W; and it should be noted that, FIG. 10 and FIG. 11 are both simulation results in a case where the pixel size is fixed (both with a width of 31.55 um); the difference is that, the second electrode of the transition pixel corresponding to FIG. 10 includes two sub-electrodes, and the second electrode of the transition pixel corresponding to FIG. 11 includes three sub-electrodes. It can be seen from FIG. 10 that, the relationship between the pixel transmittance and W is inversely proportional when W>3 μm, the relationship between the pixel transmittance and W is proportional when W<3 μm, and the pixel transmittance is 100% when W=3 μm; as shown in FIG. 11, the relationship between the pixel transmittance and W is inversely proportional when W>2 μm, the relationship between the pixel transmittance and W is proportional when W<2 μm, and the pixel transmittance is 100% when W=2 μm.

Figure 12A:
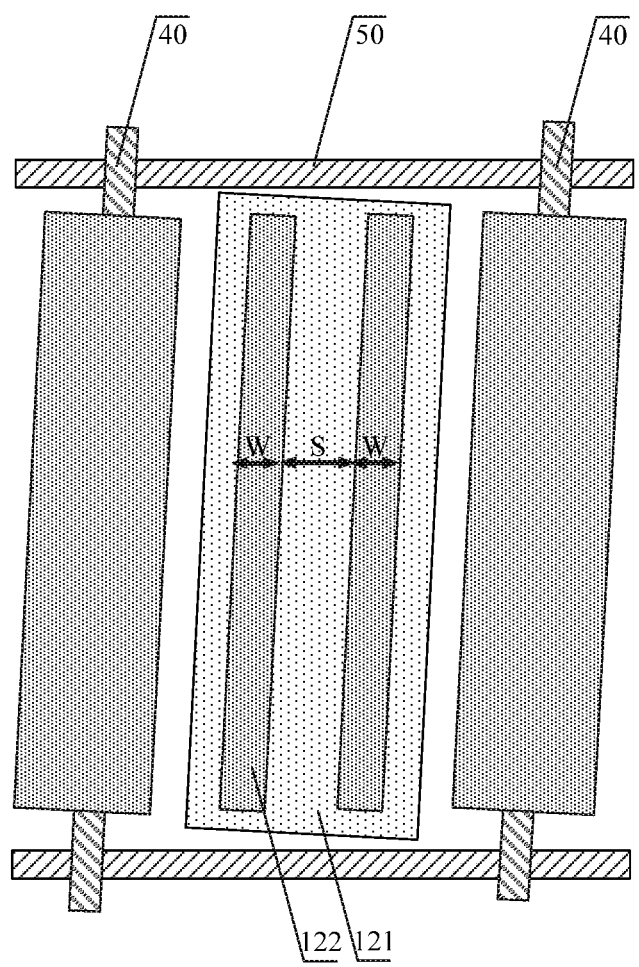
FIG. 12A is a top view I of the transition pixel provided by the embodiment of the present disclosure.
Figure 12B:
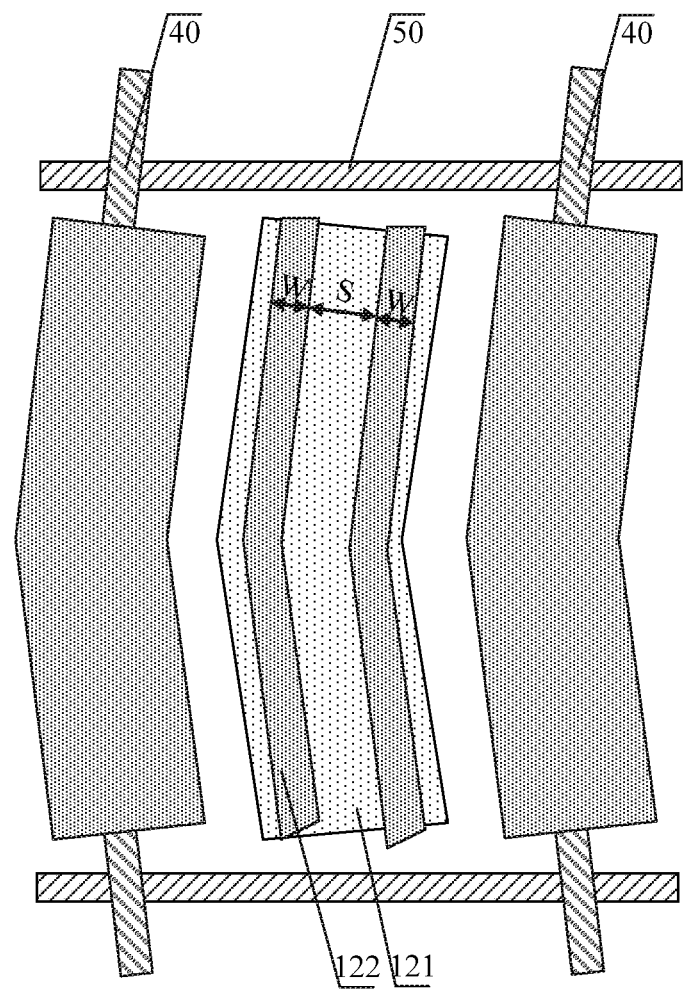
FIG. 12B is a top view II of the transition pixel provided by the embodiment of the present disclosure.
Figure 12C:
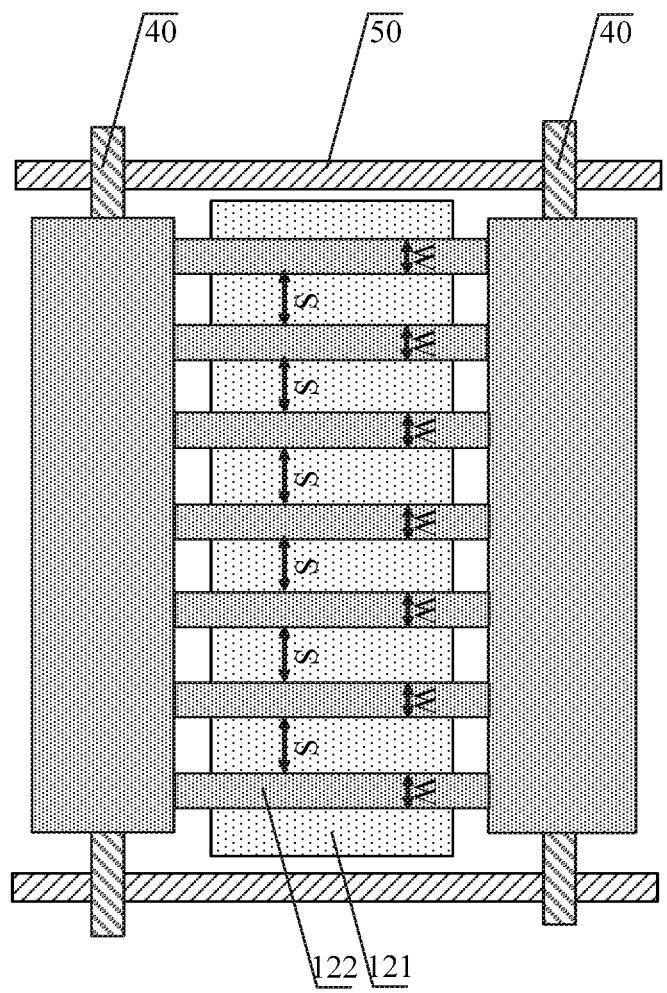
FIG. 12C is a top view III of the transition pixel provided by the embodiment of the present disclosure.
Figure 12D:
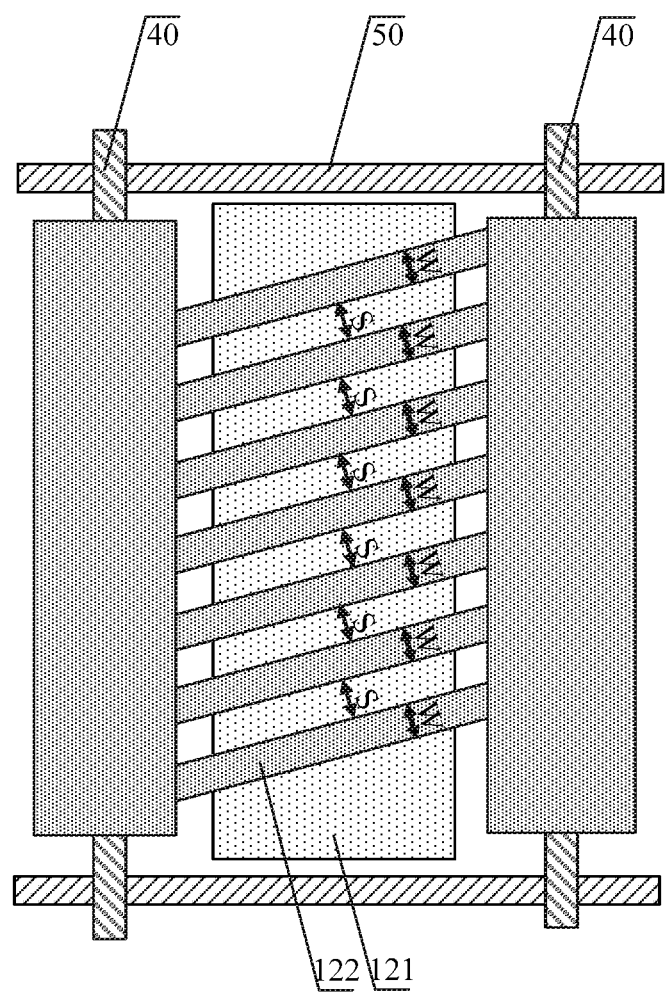
FIG. 12D is a top view IV of the transition pixel provided by the embodiment of the present disclosure.
Figure 12E:
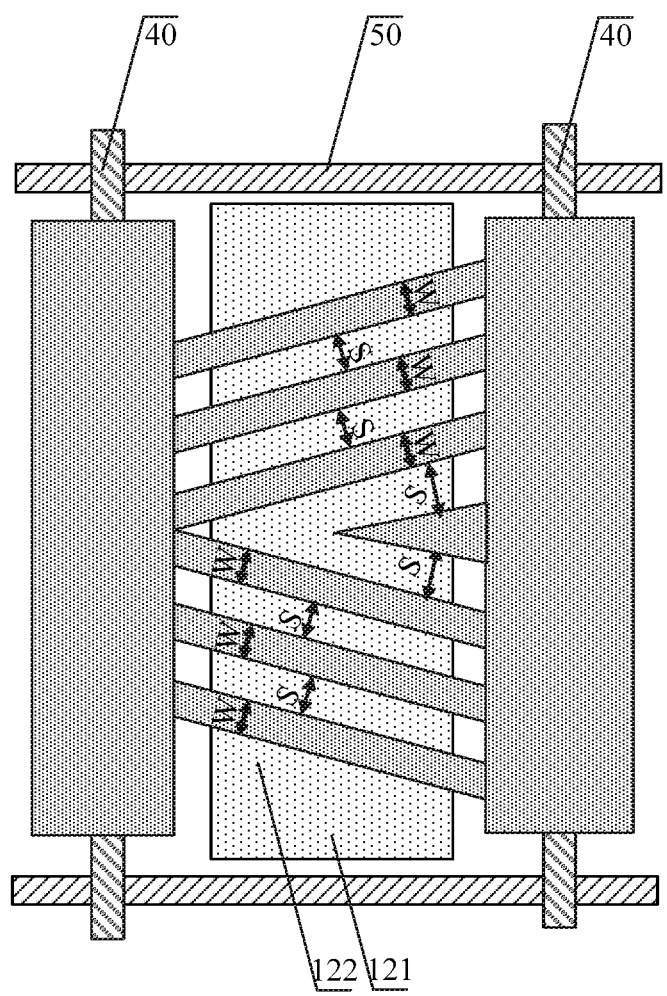
FIG. 12E is a top view V of the transition pixel provided by the embodiment of the present disclosure.
Figure 12F:
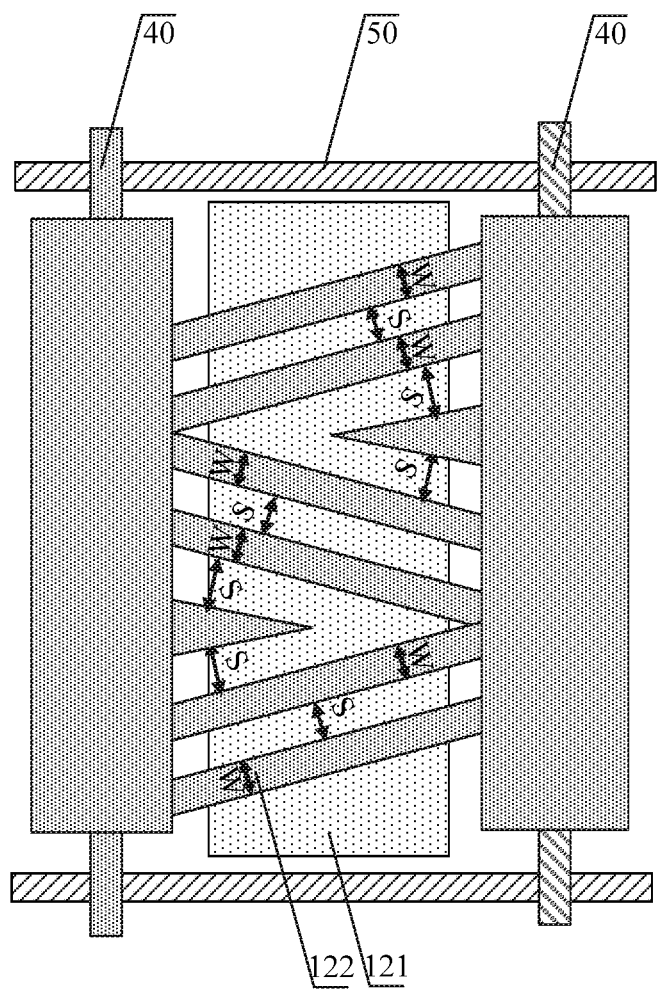
FIG. 12F is a top view VI of the transition pixel provided by the embodiment of the present disclosure.

FIG. 6 to FIG. 9 in the embodiment of the present disclosure are described only by taking the slit electrode as vertical linear design. FIG. 12A is a top view I of the transition pixel provided by the embodiment of the present disclosure, and FIG. 12A is described by taking the second electrode as vertical oblique linear design; FIG. 12B is a top view II of the transition pixel provided by the embodiment of the present disclosure, and FIG. 12B is described by taking the second electrode as a vertical symmetric oblique electrode; FIG. 12C is a top view III of the transition pixel provided by the embodiment of the present disclosure, and FIG. 12C is described by taking the second electrode as a horizontal linear electrode; FIG. 12D is a top view IV of the transition pixel provided by the embodiment of the present disclosure, and FIG. 12D is described by taking the second electrode as a horizontal oblique linear electrode; FIG. 12E is a top view V of the transition pixel provided by the embodiment of the present disclosure, FIG. 12E is described by taking the second electrode as a horizontal symmetric oblique electrode, and sub-electrodes in FIG. 12E further include a triangular electrode in addition to the horizontal oblique linear electrode; FIG. 12F is a top view VI of the transition pixel provided by the embodiment of the present disclosure, FIG. 12F is described by taking the second electrode as a zigzag electrode, and sub-electrodes in FIG. 12F further include a plurality of triangular electrodes in addition to the horizontal oblique linear electrode. It should be noted that, the embodiment of the present disclosure may also be applied to various other types of electrodes besides the vertical linear electrode, the vertical oblique linear electrode, the vertical symmetric oblique electrode, the horizontal linear electrode, the horizontal oblique linear electrode, the horizontal symmetric oblique electrode, and the zigzag electrode that are taken as the second electrode on a similar implementation principle to achieve a similar implementation effect, which will not be enumerated one by one here in the embodiment of the present disclosure. Specifically, FIG. 12A to FIG. 12F are all described by taking an example in which the second electrode includes at least two sub-electrodes.

In the above-described embodiment, the transition pixel and the display pixel are set to be different in area of at least one of the first electrode and the second electrode, such that the transmittance of the transition pixel is less than the transmittance of the display pixel under control of a same display signal (e.g., voltage). However, the embodiment according to the present disclosure is not limited thereto. For example, a relatively small display gray scale of the transition pixel is implemented by adjusting the transmittance, thereby reducing jaggedness. Therefore, the above-described control of transmittance by setting the electrode area may be applied to a transmissive liquid crystal display panel. Similarly, with respect to a reflective panel, by controlling the electrode area, pixel reflectivity may also be controlled, so as to control display gray scales of different pixels. Or, with respect to a self-luminous display panel, for example, an Organic Light Emitting Diode (OLED) display panel, display gray scales of the transition pixel and the display pixel under a same display signal may also be controlled to be different in a mode such as controlling a light-emitting layer and an electrode area. Therefore, according to an embodiment of the present disclosure, there is further provided a display panel, comprising: a base substrate, a display region and a non-display region provided on the base substrate; wherein, the display region has a special-shaped boundary and includes: a plurality of display pixels and transition pixels; and the display pixel and the transition pixel are configured such that a gray scale displayed by the transition pixel is less than a gray scale displayed by the display pixel under control of a same display signal. For other features in the display panel according to this embodiment, various features of the foregoing embodiments may all be referred to, and no details will be repeated here.

Based on the inventive concept of the above-described embodiment, an embodiment of the present disclosure further provides a fabrication method of a display panel, for fabricating the display panel provided by the above-described embodiment, and the fabrication method of the display panel provided by the embodiment of the present disclosure specifically comprises the following steps.

Step 100: providing a base substrate.

Step 200: forming a display region and a non-display region on the base substrate.

In this embodiment, the display region has a special-shaped boundary, and includes: a plurality of display pixels and transition pixels; the transition pixel is provided between the display pixel and the special-shaped boundary; the display pixel and the transition pixel each include: a first electrode and a second electrode insulated from the first electrode; and the first electrode and the second electrode are configured to apply a voltage to the display pixel or the transition pixel corresponding thereto.

An area of the first electrode of the transition pixel is different from an area of the first electrode of the display pixel, and/or an area of the second electrode of the transition pixel is different from an area of the second electrode of the display pixel, such that transmittance of the transition pixel is less than transmittance of the display pixel when a same voltage is loaded to the display pixel and the transition pixel.

For example, the fabrication method of the display panel provided by the embodiment of the present disclosure further comprises: forming an insulating layer between the first electrode and the second electrode.

The fabrication method of the display panel provided by the embodiment of the present disclosure comprises: providing the base substrate, forming the display region and the non-display region on the base substrate; the display region having a special-shaped boundary, and including: a plurality of display pixels and transition pixels; the transition pixels being provided between the display pixels and the special-shaped boundary; the display pixel and the transition pixel each including: a first electrode and a second electrode insulated from the first electrode; and the first electrode and the second electrode being configured to apply a voltage to the display pixel or the transition pixel corresponding thereto; wherein, the area of the first electrode of the transition pixel is different from the area of the first electrode of the display pixel, and/or the area of the second electrode of the transition pixel is different from the area of the second electrode of the display pixel, such that the transmittance of the transition pixel is less than the transmittance of the display pixel when a same voltage is loaded to the display pixel and the transition pixel. In the embodiment of the present disclosure, the area of the first electrode of the transition pixel is different from the area of the first electrode of the display pixel, and/or the area of the second electrode of the transition pixel is different from the area of the second electrode of the display pixel, which can implement transitional change in brightness, weaken user's perception of brightness change at the special-shaped boundary of the display picture, make a picture near the special-shaped boundary more natural and soft, and blur jaggedness or graininess appearing at the edge of the display panel to a certain extent, thereby improving display quality.

Based on the inventive concept of the above-described embodiment, an embodiment of the present disclosure further provides a display apparatus, comprising: the display panel provided by the above-described embodiment.

The display apparatus provided by the embodiment of the present disclosure comprises the display panel provided by the above-described embodiment; and based on the display panel provided by the above-described embodiment of the present disclosure, the display apparatus provided by this embodiment can weaken jaggedness or graininess appearing in a picture displayed in the region, thereby improving display quality of the picture, and improving user experience.

In actual application, the display apparatus according to this embodiment may be a liquid crystal television, a liquid crystal display, a digital photo frame, a mobile phone, a tablet personal computer, or any other product or component having a display function, especially a display product having a high screen-to-body ratio, such as a full-screen display device and a smart wearable device.

It should be noted that, the display apparatus provided by the embodiment of the present disclosure may be in an In-plane Switching (IPS) mode or a Fringe Field Switching (FFS) mode, and other similar in-plane electric field display mode, which will not be limited by the embodiment of the present disclosure.

Only the structures relevant to the embodiments of the present invention are involved in the accompanying drawings of the embodiments of the present invention, and other structures may refer to the prior art.

For clarity, the thickness of layers or areas in the accompanying drawings of the embodiments of the present invention is enlarged. It should be understood that when an element such as a layer, a film, an area or a substrate is referred to be disposed "on" or "beneath" another element, the element may be "directly" disposed "on" or "beneath" another element, or an intermediate element may be provided.

The embodiments of the present invention and the characteristics in the embodiments may be mutually combined without conflict.

The foregoing is merely exemplary embodiments of the invention, but is not used to limit the protection scope of the invention. The protection scope of the invention shall be defined by the attached claims.

The present application claims priority of China Patent application No. 201910279399.4 filed on Apr. 9, 2019, the content of which is incorporated in its entirety as portion of the present application by reference herein.

The invention claimed is:

1. A display panel, comprising: a base substrate, and a display region and a non-display region on the base substrate;
   wherein the display region has a special-shaped boundary, and includes: a plurality of display pixels and transition pixels; the transition pixels are provided between the display pixels and the special-shaped boundary; each of the display pixels and each of the transition pixels respectively include: a first electrode and a second electrode insulated from the first electrode; and the first electrode and the second electrode are configured to apply a voltage to the display pixel or the transition pixel corresponding thereto;
   wherein the first electrodes and the second electrodes of the transition pixels and the display pixels satisfy at least one of the following relationships: an area of each of the first electrodes of the transition pixels is different from an area of each of the first electrodes of the display pixels; and an area of each of the second electrodes of the transition pixels is different from an area of each of the second electrodes of the display pixel,
   wherein the first electrode is a pixel electrode and the second electrode is a common electrode; or the first electrode is the common electrode and the second electrode is the pixel electrode,
   wherein the first electrode is a planar electrode, and the second electrode is a slit electrode;
   the slit electrode includes: at least two sub-electrodes with a slit provided between two adjacent sub-electrodes,
   the second electrodes of the transition pixel and the second electrodes of the display pixel have at least one of the following differences therebetween: numbers of the sub-electrodes are different, and widths of the sub-electrodes are different,
   at least one row or one column of transition pixels are provided; and in a direction from a side close to the special-shaped boundary to a side away from the special-shaped boundary:
   both the numbers of sub-electrodes and the widths of the sub-electrodes in the row or the column of the transition pixels gradually decrease,
   a value range of a gray scale of the transition pixels is 0 to 255, the value range of the gray scale has four intervals, a step size of each of the respective intervals is 64, a gray scale range of the respective intervals are respectively 0 to 63, 64 to 127, 128 to 191, and 192 to 255, feature values of the respective intervals are from minimum values (0, 64, 128, 192), or maximum values (63, 127, 191, 255), or intermediate values (35, 96, 150, 224).

2. The display panel according to claim 1, wherein the plurality of display pixels and transition pixels are arranged in a two-dimensional matrix along a row direction and a column direction; and the special-shaped boundary is neither parallel nor perpendicular to the row direction and the column direction.

3. The display panel according to claim 2, wherein the special-shaped boundary has a circular arc shape.

4. The display panel according to claim 1, wherein at least one row or one column of transition pixels is provided; and in the direction from the side close to the special-shaped boundary to the side away from the special-shaped boundary, areas of the first electrodes, areas of the second electrodes, or areas of both the first electrodes and the second electrodes of the row or the column of transition pixels gradually increase or decrease.

5. The display panel according to claim 1, wherein each of the transition pixels and each of the display pixels further include an insulating layer, respectively; and
   the insulating layer is provided between the first electrode and the second electrode.

6. The display panel according to claim 1, wherein the transition pixels and the display pixels have an equal area.

7. The display panel according to claim 1, wherein an orthogonal projection of the first electrode on the base substrate covers an orthogonal projection of the second electrode on the base substrate.

8. The display panel according to claim 7, wherein a material of the first electrode and the second electrode includes a transparent conductive material.

9. A display apparatus, comprising: the display panel according to claim 1.

10. A fabrication method of a display panel, comprising:
    providing a base substrate; and
    forming a display region and a non-display region on the base substrate, the display region having a special-shaped boundary, and including: a plurality of display pixels and transition pixels, the transition pixels being provided between the display pixels and the special-shaped boundary, each of the display pixels and each of the transition pixels respectively including: a first electrode and a second electrode insulated from the first electrode; and the first electrode and the second electrode being configured to apply a voltage to the display pixel or the transition pixel corresponding thereto,
    wherein the first electrodes and the second electrodes of the transition pixels and the display pixels satisfy at least one of the following relationships: an area of each of the first electrodes of the transition pixels is different from an area of each of the first electrodes of the display pixels; and an area of each of the second electrodes of the transition pixels is different from an area of each of the second electrodes of the display pixel,
    wherein the first electrode is a pixel electrode and the second electrode is a common electrode; or the first electrode is the common electrode and the second electrode is the pixel electrode,
    wherein the first electrode is a planar electrode, and the second electrode is a slit electrode;
    the slit electrode includes: at least two sub-electrodes with a slit provided between two adjacent sub-electrodes,
    the second electrodes of the transition pixel and the second electrodes of the display pixel have at least one of the following differences therebetween: numbers of the sub-electrodes are different, and widths of the sub-electrodes are different,
    at least one row or one column of transition pixels are provided; and in a direction from a side close to the special-shaped boundary to a side away from the special-shaped boundary:
    both the numbers of sub-electrodes and the widths of the sub-electrodes in the row or the column of the transition pixels gradually decrease,
    a value range of a gray scale of the transition pixels is 0 to 255, the value range of the gray scale has four intervals, a step size of each of the respective intervals is 64, a gray scale range of the respective intervals are respectively 0 to 63, 64 to 127, 128 to 191, and 192 to 255, feature values of the respective intervals are from minimum values (0, 64, 128, 192), or maximum values (63, 127, 191, 255), or intermediate values (35, 96, 150, 224).

11. The method according to claim 10, further comprising:
forming an insulating layer between the first electrode and the second electrode.

* * * * *